(12) United States Patent
Hunter

(10) Patent No.: US 6,366,557 B1
(45) Date of Patent: *Apr. 2, 2002

(54) METHOD AND APPARATUS FOR A GIGABIT ETHERNET MAC (GMAC)

(75) Inventor: Van Hunter, San Jose, CA (US)

(73) Assignee: Nortel Networks Limited, St. Laurent (CA)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/069,439

(22) Filed: Apr. 29, 1998

Related U.S. Application Data

(60) Provisional application No. 60/063,970, filed on Oct. 31, 1997.

(51) Int. Cl.[7] .............................................. H04L 12/26
(52) U.S. Cl. ....................... 370/217; 370/228; 370/419
(58) Field of Search .................................. 370/227, 228, 370/216, 217, 218, 222, 224, 401, 402, 225, 389, 419, 420, 422, 423, 428, 429

(56) References Cited

U.S. PATENT DOCUMENTS

| | | | | |
|---|---|---|---|---|
| 3,859,468 A | * | 1/1975 | Smith ........................... 179/15 |
| 4,527,270 A | * | 7/1985 | Sweeton ...................... 370/224 |
| 4,709,365 A | * | 11/1987 | Beale et al. ................. 370/224 |
| 4,887,256 A | * | 12/1989 | Nakayashiki ................ 370/16 |
| 4,964,120 A | * | 10/1990 | Mostashari ................... 370/16 |
| 5,249,183 A | * | 9/1993 | Wong ......................... 370/85.3 |
| 5,485,576 A | * | 1/1996 | Fee ......................... 395/185.09 |
| 5,487,062 A | * | 1/1996 | Yanagi et al. ............... 370/224 |
| 5,761,245 A | * | 6/1998 | Haukkavaara .............. 375/267 |
| 5,781,715 A | * | 7/1998 | Sheu ...................... 395/182.02 |
| 5,870,382 A | * | 2/1999 | Tounai ....................... 370/220 |
| 5,959,972 A | * | 9/1999 | Hamami ..................... 370/228 |
| 6,081,511 A | * | 6/2000 | Carr ........................... 370/256 |

\* cited by examiner

*Primary Examiner*—Ricky Ngo
*Assistant Examiner*—Phuc Tran
(74) *Attorney, Agent, or Firm*—Blakely Sokoloff Taylor & Zafman, LLP

(57) ABSTRACT

A method and apparatus for a media access controller supporting redundant links are provided. According to one aspect of the present invention a media access controller includes a two transceivers for communication with an source and/or destination port. Each transceiver has a receiver and transmitter. When the media access controller sets up a physical link to the desired source and/or destination port each transceiver sets up a separate physical link to the source and/or destination port. One of the physical links is the primary physical link and the other is a redundant or backup physical link. By using two physical links if a failure of interrupt occurs on the primary physical link then a switch-over is performed to use the redundant physical link.

22 Claims, 4 Drawing Sheets

METHOD AND APPARATUS FOR A GIGABIT ETHERNET MAC (GMAC)

This application claims the benefit of U.S. Provisional Application No. 60/063,970 filed on Oct. 31, 1997.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The invention relates generally to the field of computer networking devices. More particularly, the invention relates to a Gigabit media access controller (GMAC) having support for redundant physical links.

2. Background Information

With Local Area Network (LAN) switches now operating at data transfer rates of up to 1 Gigabit per second (Gbps), switch-over from a failed physical link to another physical link is of critical importance.

As used herein, the terms Ethernet, Fast Ethernet, and Gigabit Ethernet shall apply to Local Area Networks (LANs) employing Carrier Sense, Multiple Access with Collision Detection (CSMA/CD) as the medium access method, generally operating at a signaling rate of 10 Megabits per second (Mbps), 100 Mbps, and 1,000 Mbps, respectively over various media types and transmitting Ethernet formatted or Institute of Electrical and Electronic Engineers (IEEE) standard 802.3 formatted data packets.

In the prior art there are methods and systems which support redundancy of signals, however, the switch-over from the failed data stream to the redundant data stream in the prior methods and systems tend to have a long latency.

In one prior art switch system two media access controllers (MACs) are used to create a redundancy of signals between the switch and the respective source and/or destination port. FIG. 1 illustrates a switch 150 that uses two MACs 160 & 165 to create redundant links between the switch 150 and at least one of input/output (I/O) devices 101–104. One of the MACs 160 & 165 is the primary MAC and the other is the redundant (or backup) MAC. Both MACs 160 & 165 set up links to the desired source and/or destination port, here one of the I/O devices 101–104. For the sake of an example, MAC 160 sets up a primary link to I/O device 102 and MAC 165 sets up the redundant link to the same I/O device 102. While MAC 160 communicates with I/O device 102 along the primary link, the redundant link remains idle with no communication between MAC 165 and I/O device 102.

However, when a link failure or interrupt occurs along the primary link, the system must switch over to the redundant (or backup) link. For the purposes of the example given above, this means that the system must shut down (or set to idle) the primary link between primary MAC 160 and I/O device 102 and switch over to the redundant link between the redundant MAC 165 and I/O device 102. This "switch-over" is sometimes done using a software algorithm, for example Spanning Tree Protocol, which takes a long time, i.e. a few to several seconds, to switch from the broken or interrupted link to the redundant or backup link. On a high-speed link, such as a Gigabit Ethernet, a few to several seconds may equate to a large amount of traffic lost at the core of the enterprise network.

Thus, what is needed is a method and system for supporting redundant links with fast switch-over times.

SUMMARY OF THE INVENTION

A method and apparatus for a media access controller supporting redundant links are described. According to one aspect of the present invention a media access controller includes a two transceivers for communication with an source and/or destination port. Each transceiver has a receiver and transmitter. When the media access controller sets up a physical link to the desired source and/or destination port each transceiver sets up a separate physical link to the source and/or destination port. One of the physical links is the primary physical link and the other is a redundant or backup physical link. By using two physical links if a failure of interrupt occurs on the primary physical link then a switch-over is performed to use the redundant physical link.

Additional features and benefits of the present invention will become apparent from the detailed description, figures, and claims set forth below.

BRIEF DESCRIPTION OF THE DRAWINGS

The present invention is illustrated by way of example and not limitation in the accompanying figures in which.

DETAILED DESCRIPTION

A Method and Apparatus for a Gigabit Ethernet MAC (GMAC) is disclosed. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software. Importantly, while embodiments of the present invention will be described with reference to a switch for an Ethernet network, the method and apparatus described herein are equally applicable to other types of switches and networks.

An Exemplary Switching Device Architecture

Figure 1:
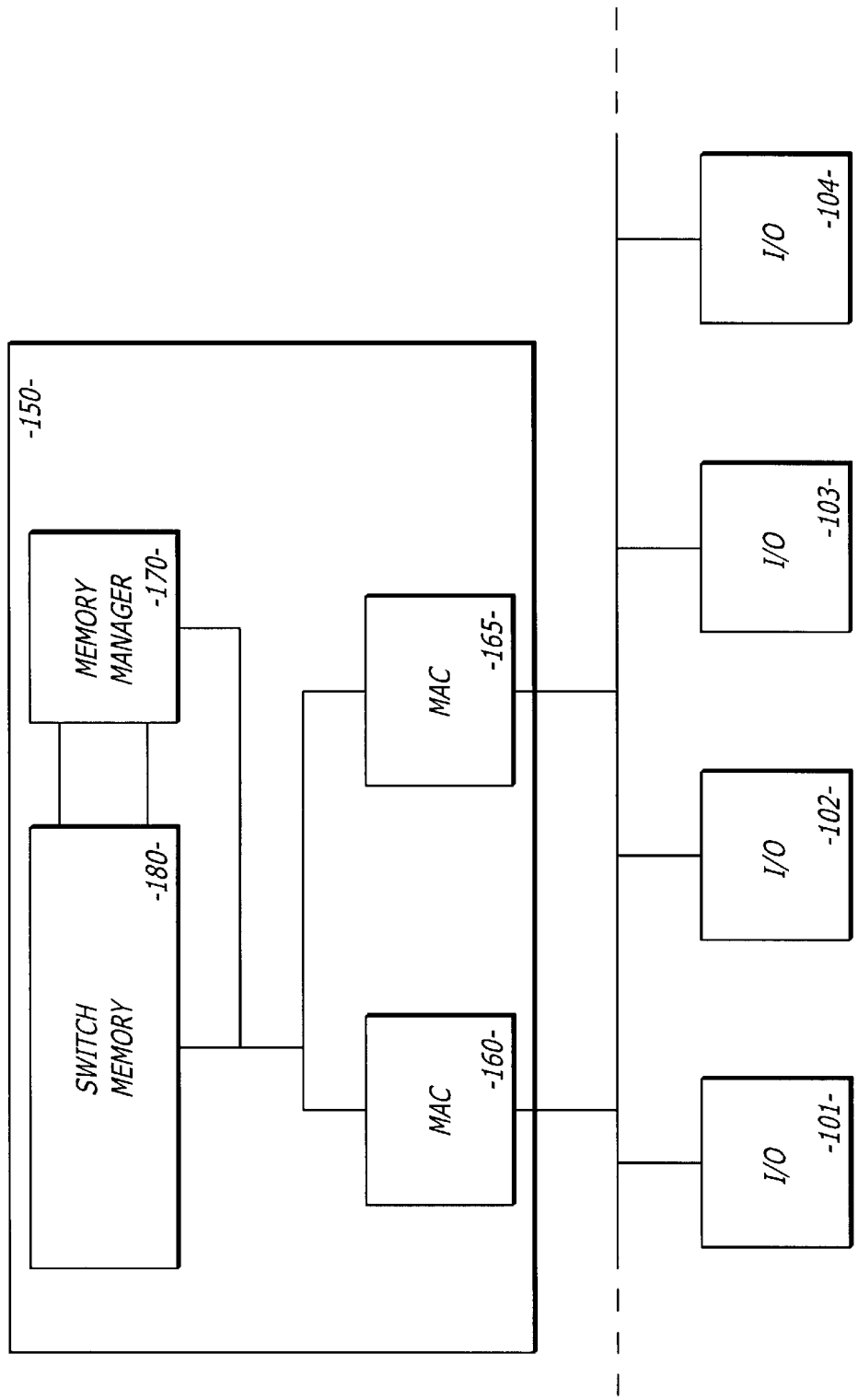
FIG. 1 illustrates a block diagram of a switch using multiple media access controllers to create redundant links.
Figure 2:
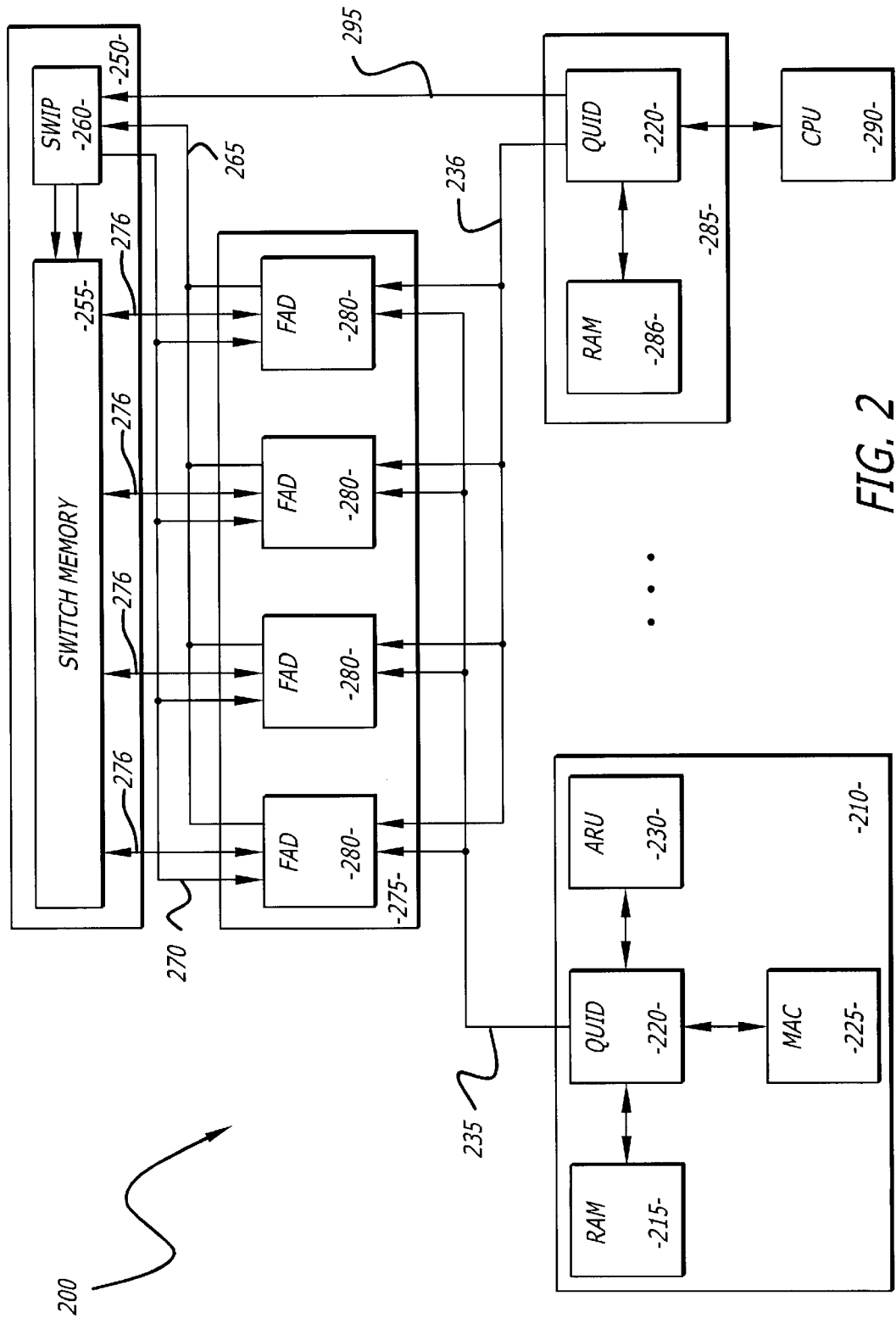
FIG. 2 illustrates an embodiment of a switch according to the teachings of the present invention.

An overview of the architecture of a network device, e.g., switching device 200, in which an embodiment of the present invention may be implemented is illustrated by FIG. 2. According to the embodiment depicted, switching device 200 is an output buffered, shared memory switch.

Starting at a high level, switching device 200 includes a plurality of input/output (I/O) interfaces 210, e.g., I/O slots, coupled in communication with a switch core. The switch core comprises a switch fabric 250 and a fabric interface 275. Also coupled to the switch core via interface 285 is a central processing unit (CPU) 290 which may facilitate management of forwarding and filtering databases of the I/O interfaces 210.

Packets enter the switching device 200 via one of the plurality of I/O interfaces 210. The inbound packet data is provided by the I/O interface 210 to the fabric interface 275 which steers the data through the switch fabric 250. When the packet data exits the switch fabric 250 it passes again through fabric interface 275 and ultimately to one or more I/O interfaces 210 from which the packet data is to be transmitted.

The I/O interfaces 210 are coupled to the switch core through a bus interface 235 (also referred to as the "switch tap", or "tap bus"). The switch tap 235 moves packet data between the fabric interface 275 and the I/O interface 210. While for convenience, only one I/O interface 210 has been depicted, it should be appreciated the tap bus 235 may comprise a plurality of point-to-point buses coupling each I/O interface 210 to the fabric interface 275. The fabric interface 275 may be thought of conceptually as a large multiplexer (MUX)/demultiplexer (demux) with storage.

The fabric interface 275 muxes the tap buses 235 into a bus 276 coupled to the switch fabric 250. Forwarding control bits from the packet data are also presented by the fabric interface 275 to the switch fabric 250 to facilitate cell queuing. The switch fabric 250 includes a switch memory 255 and a switch processor (SWIP) 260. The SWIP 260 logically organizes the packet data read into the switch memory 255 by associating the packet data with one of a plurality of output queues. Additionally, the SWIP 260 controls the flow of data between the fabric interface 275 and the switch memory 255 and the flow of data between the fabric interface 275 and the I/O interfaces 210.

Referring again to the I/O interfaces 210, each may include one or more Port Interface Devices (PIDs), such as a Quad-port Interface Device (QUID) 220 or a Gigabit Interface Device (GID) not shown. The I/O interfaces 210 may each additionally include one or more Media Access Controllers (MACs) 225, Address Resolution Units (ARUs) 230, and memories 215. In one embodiment, one or more of the MACs 225 include 84C301 Seeq Quad 10/100 MAC devices which may support up to four 10/100 Megabit per second (Mbps) ports (not shown). While, for the sake of explanation, (CSMA/CD) is assumed to be the medium access method employed by the MACs 225, it is appreciated that the MACs 225 may operate according to other communication protocols, such as the well-known Fiber Distributed Data Interface (FDDI) or Asynchronous Transfer Mode (ATM) communication protocols. In one embodiment of the switching device 200, MAC 225 supports redundant physical links between the switching device and the I/O devices with which switching device 200 communicates. An embodiment of the MAC with support for redundant physical links will be described in more detail below.

In the embodiment of the switching device 200 illustrated in FIG. 2, packets are forwarded among QUIDs 220 through the switch core in the form of fixed-length cells. The QUID 220 fragments inbound packets (i.e., those received from the MAC 225) prior to providing them to the fabric interface 275 and performs reassembly upon outbound cells (i.e., those received from the fabric interface 275). As packets are read from the MAC 225, forwarding control information necessary for steering the packet through the switch fabric 250 to the QUID 220 at which the packet will exit (e.g., the egress PID) may be prepended and/or appended to packets and/or the associated fixed-length cells by the ingress PID (e.g., the QUID 220 upon which a particular packet is received). The forwarding control information may also include information indicating the need for certain other packet/cell processing. For instance, a multicast flag may be provided in the cell header to cause the egress PID to replace the source MAC address for IP Multicast routed packets.

The ingress PID interfaces with its associated ARU 230 to acquire the forwarding control information associated with a packet. As the QUID 220 performs packet fragmentation, an address look-up request, which contains the destination Network layer address to which the packet is addressed (e.g., the destination Internet Protocol (IP) address), may be sent to the ARU 230. Upon completion of the address look-up, the ARU 230 returns the forwarding control information associated with the packet. Typically, the ARU 230 processes address look-up requests in the order received. The ARU processing may include performing Layer 2, e.g., Media Access Control (MAC) layer, or Layer 3, e.g., Network layer, address look-up to determine the forwarding control information such as, the destination address (e.g., a multicast address or egress PID and egress port identifier pair). The forwarding control information may then be inserted into packet and/or cell headers or trailers before the cells are provided to the fabric interface 275.

The fabric interface 275 comprises a plurality of fabric access devices (FADs) 280. Cells may be exchanged between the QUIDs 220 and the FADs 280 by handshaking with the SWIP 260. Each FAD 280 muxes the tap buses 235 coupled to the PIDs 210 into the bus 276 coupled to the switch memory 255. Each FAD 280 may buffer a plurality of cells in either direction (e.g., transmit or receive). Additionally, FADs 280 include two separate and independent paths, e.g., data path 276 and control path 265, the former conveying cell data as a whole to the switch memory 255 and the latter providing to the SWIP 260 a subset of the data associated with a cell, such as the forwarding control information.

The switch fabric 250, in one embodiment the switch memory 255 is implemented with a 64 K×256 pipelined synchronous static random access memory (SRAM). However, it is appreciated that various other types of random access memory (RAM) may be employed to provide for the temporary storage of cells received from the fabric interface 275. Above, it was mentioned that the SWIP 260 controls the movement of cells between the fabric interface 275 and the QUIDs 220 and manages the storage and retrieval of data to and from the switch memory 255. Many different handshaking mechanisms are available for coordinating the exchange of cells between the QUIDs 220 and the FADs 280 and between the FADs 280 and the switch memory 255. For instance, the SWIP 260 may present read and write ready signals and receive read and write enable signals to control the flow of cells. Various alternative approaches will no doubt be recognized by those of ordinary skill in the art.

It is appreciated that each of the functional units described above may be implemented with hard wired circuitry, Application Specific Integrated Circuits (ASICs), by causing a processor to execute instructions, or a combination thereof. Importantly, the present invention is not limited to a particular implementation of these functional units.

MAC With Support for Redundant Physical Links

Figure 3:
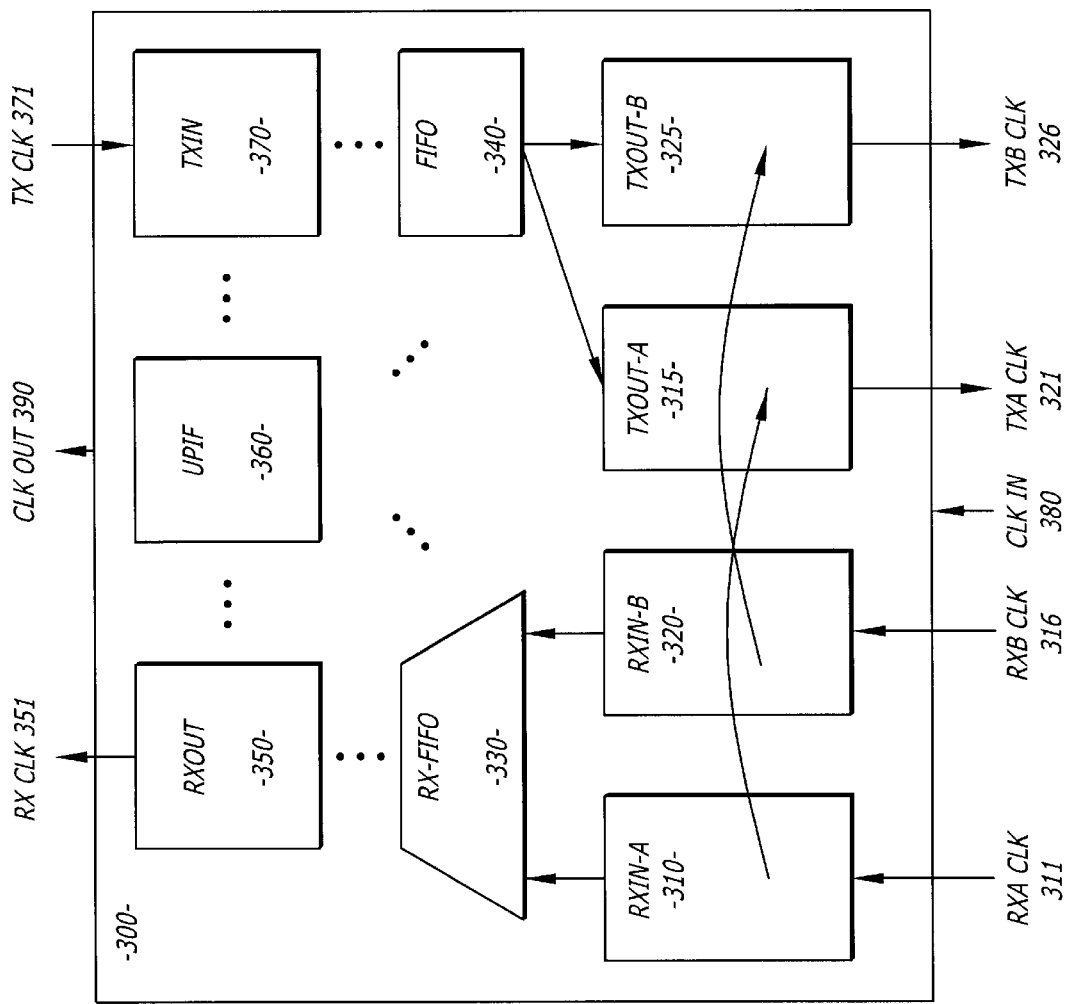
FIG. 3 illustrates a block diagram of a media access controller according to one embodiment of the present invention.

FIG. 3 illustrates a block diagram of a media access controller 300 according to one embodiment of the present invention. Media access controller (MAC) 300 provides media access between a port interface device (PID) (e.g., a QUID as illustrated in FIG. 2, or a GID, not shown) and input/output (I/O) devices. In one embodiment, MAC 300 interfaces to the PID via a two 16 bit bus interfaces, one for transmit and one for receive. Referring to FIG. 3, these bus interfaces are referred to as RXOUT 350 and TXIN 370. MAC 300 also includes a 16 bit CPU interface (UPIF) 360 which provides interrupts for selectable status events.

Additionally, MAC 300 provides support for two separate physical transceivers, which will be referred to as Transceiver-A and Transceiver-B (not illustrated). One of the transceivers of MAC 300 is selected as the primary or in-use transceiver for setting up the primary physical link with a source and/or destination port (an I/O device) and the other transceiver serves as a redundant or backup transceiver setting up a separate redundant or backup physical link with the same I/O device. Each Transceiver includes a receiver and a transmitter. For example as illustrated in FIG. 3, Transceiver-A includes a receiver labeled RXIN-A 310 and a transmitter labeled TXOUT-A 315 and Transceiver-B includes a receiver labeled RXIN-B 320 and a transmitter labeled TXOUT-B 325.

In one embodiment, MAC 300 does not provide first-in/first-out (FIFO) functions to the PID (i.e., the GID or QUID) for the sake of adjusting an arbitrary PID-to-MAC clock rate required by the Ethernet network. Instead in this embodiment the clock domains are setup such that the MAC is a straight flow-through device, with the FIFO functions most typically thought of as being part of the MAC, being performed by the PID itself. This is due in large part to the setup of the clock domains for the MAC.

In one embodiment, MAC 300 contains four clock domains. Two of the clock domains RXACLK 311 and RXBCLK 316 are set up at each of the receivers RXIN-A and RXIN-B, respectively. For example, each of the receivers may extract a 62.5 MHz clock from the receive data that the transceiver is accepting. Another clock domain, TXCLK 371, is set up at the transmit input (TXIN) 370 which accepts packet data from the PID. For example, TXIN 370 may be driven by a TXCLK 371 which is an external 62.5 MHz clock. The last clock domain drives the remainder of the MAC from an external clock CLKIN 380. For example, CLKIN 380 may be an external 125 MHz clock. CLKIN 380 is used to clock the transmit data out to the external devices (e.g., via RXCLK 351, CLKOUT 390, TXACLK 321, and TXBCLK 326) and to create an internal clock which runs the rest of the MAC logic.

Redundancy of Physical Links

In order to create redundant physical links, each of the receivers, RXIN-A 310 and RXIN-B 320 of MAC 300 syncs itself to a transmitter on the other end of the line at the desired I/O device. Each receiver then captures data from the line and then runs an auto-negotiation process to bring the physical link up into a normal data transfer state. During the auto-negotiation process RXIN manages the transmit side of the process by controlling TXOUT. In other words, RXIN-A 310 controls TXOUT-A 315 and RXIN-B 320 controls TXOUT-B 325. RXIN also captures the configuration of the I/O device and relays this information to the CPU status registers.

Additionally, RXIN detects error events in the receiver operation and signals these to the CPU status logic so that they may be captured and interrupts generated if desired to solicit the inspection of the event by the CPU. This may be used, for example, to signal the CPU that the primary link has failed, when an I/O device has come up or gone down, or when the I/O device has decided to switch the communication stream from the primary link to the redundant link without a prompt from the MAC to do so.

In one embodiment, RXIN-A 310 and RXIN-B 320 implement Gigabit Ethernet 802.3z Draft 3.2 compliant receivers and include: a stage to widen the data path from byte wide to 16-bits wide, two 8B10B decoders, a synchronization state machine, a receive state machine, and an auto-negotiation state machine. RXIN-A 310 and RXIN-B 320 may also include an LED to reflect the state of its receiver.

Once the RXIN-A 310 and RXIN-B 320 have accepted data or packets from the I/O device, RXIN-A 310 and RXIN-B 320 then send the packets on to RX-FIFO 330. RX-FIFO 330 accepts two 16-bit wide data paths, one from each RXIN-A 310 and RXIN-B 320, respectively. Within RX-FIFO 330, each data path is run through an independent FIFO in order to adjust for small differences in frequency and phase between the RXIN clock domain and the internal clock domain created by CLKIN 380. The outputs of each of the independent FIFOs are collected by a multiplexer (mux), also contained within the RX-FIFO 330, which passes data packets from the primary physical link through while discarding any data from the redundant physical link.

During the next stage of the RX-FIFO 330, the data stream from the primary physical link is passed through another FIFO, for example a 72-byte FIFO, in order to filter out any runt packets. If enabled, one embodiment of the RX-FIFO 330 will automatically detect, remove from the data stream, and act upon IEEE flow control packets. RX-FIFO 330 may also detect oversized packets (>1535 bytes) and tag these as "bad" during output to the next stage. Additionally, RX-FIFO 330 performs a byte count on each packet received and drives stat counters to collect statistics on the received packets.

The last stage of the receive path for MAC 300 is RXOUT 350. RXOUT 350 accepts packets from RX-FIFO 330, generates an Ethernet Cyclic Redundancy Check (CRC) for the packet, and passes the packet on to the PID. RXOUT 350 acts as a master on the receive data interface to the PID. RXOUT 350 drives a clock, RXCLK 351, out along with the 16-bit data path to the GID. An Rx__DataValid signal driven by RXOUT 350 frames the packet data and an Rx__EOP signals the last word of the packet data. RXOUT 350 also sets an Rx__ByteValid signal if both bytes of the last word are valid. RXOUT 350 raises an Rx__Err output signal during the last word transferred to the PID if the packet is errored, for example, if the CRC generated by RXOUT 350 fails to check against the CRC received with the packet then the Rx__Err output signal is raised.

The first stage of the transmit path for MAC 300 is TXIN 370. TXIN 370 acts as a slave on the transmit data interface from the PID. TXIN 370 accepts packets from the PID, filters out runts, adds a CRC when asked, and checks the CRC when not asked to add one. In order to accomplish runt filtering TXIN 370 passes the packets received from the PID through an FIFO, for example a 76-byte FIFO, and flushes any packets which fall below the acceptable minimum size for that particular MAC. TXIN 370 also accepts a clock, TXCLK 371, from the PID along with the 16-bit data path. A Tx__WrEn__L signal driven by the PID frames the packet data. A Tx__EOP input to TXIN 370 signals the last word of the packet data at which time Tx__ByteValid signals TXIN 370 if both bytes of the last word are valid and Tx__CRC__L instructs TXIN 370 as to whether or not it should append its computed CRC to the end of the packet. Additionally, TXIN 370 performs a byte count on each packet received and drives stat counters to collect statistics on the transmitted packets.

TXIN 370 then passes the packet on to FIFO 340. FIFO 340 is used to cross from the TXIN 370 clock domain to the internal clock domain which drives the final transmit stage. FIFO 340, for example may be an 8×18 FIFO.

FIFO 340 passes the packet data on to TXOUT-A 315 and TXOUT-B 325 which is the last stage of the transmit path for MAC 300. The TXOUT selected as the primary transmitter accepts packets from FIFO 340, establishes a primary link with the I/O device, and transmits the packets to the selected I/O device. The TXOUT selected as the redundant transmitter establishes a redundant or backup link with the same I/O device and dormantly sends idle signals to the I/O device. Primary TXOUT adds the appropriate preamble, start of frame, and end of frame delimiters to the packet data. During auto-negotiation TXOUT sends the proper configuration control symbols under the direction of it's respective RXIN. TXOUT transmits the configuration register as passed over to it from UPIF 360 via TXOUT's respective RXIN.

The final stage of TXOUT is passing the packets through a pair of 8B10B encoders that encode the packets. The encoded data packet which is a 20-bit data path is then clocked into a single 10-bit output register using the internal clock generated by CLKIN 380. In order to control the phase relationships between the clock and the data sent to the I/O device, the TXOUT sends both the data and the clock signal, TXACLK 321 or TXBCLK 326 depending upon which TXOUT is the primary physical link, to the I/O device.

It should be noted that in one embodiment, neither TXOUT-A 315, TXOUT-B 325, nor any other stage of the transmit path of MAC 300 does anything to guarantee that the minimum interpacket gap time of the particular network is observed. In such an embodiment it is the responsibility of the PID itself to ensure that the interpacket gap time is being observed when the PID transmits the packet to the MAC. Additionally, it should be noted that TXOUT-A 315 and TXOUT-B 325 may also include an LED to reflect the state of the transmitter.

Creation and Switch-Over of Redundant Physical Links

Figure 4:
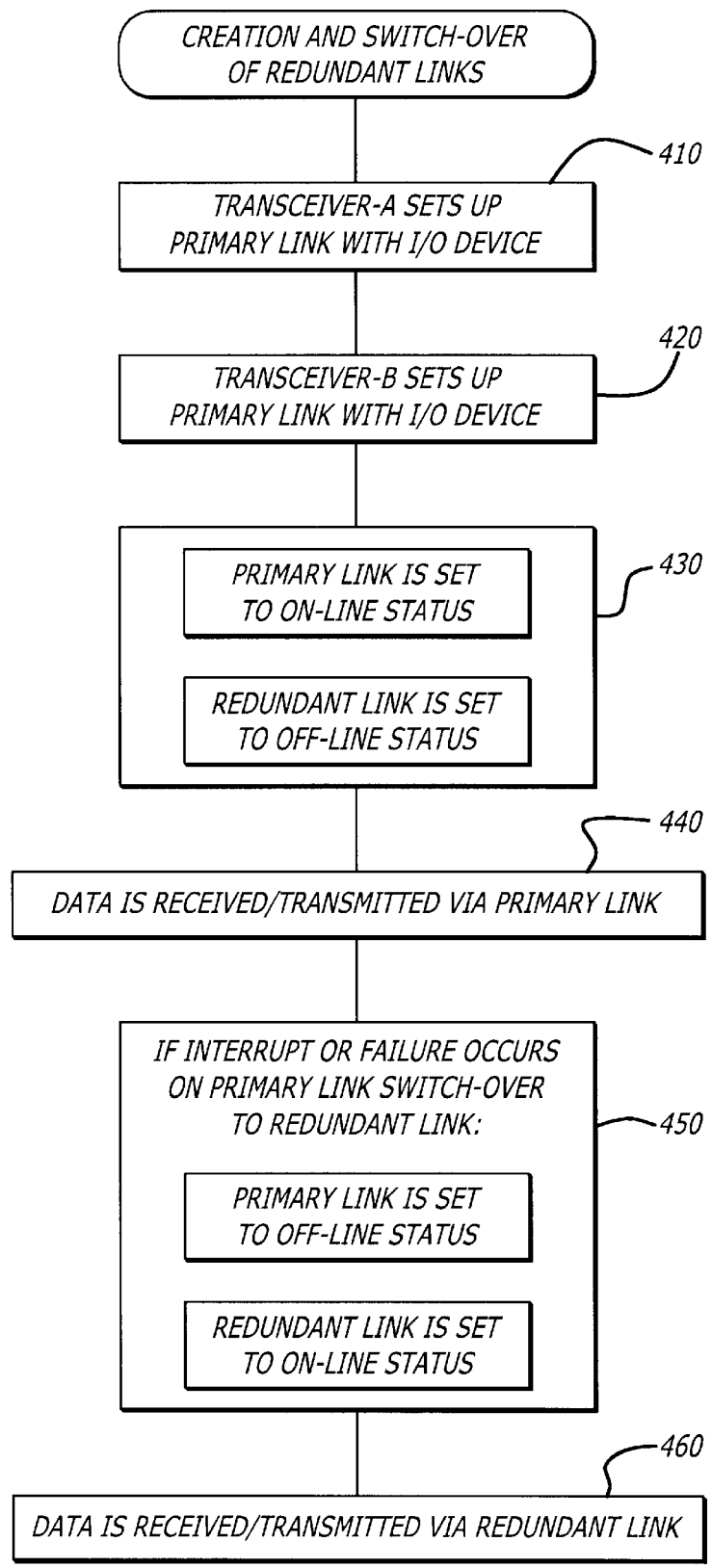
FIG. 4 illustrates a flow diagram for the creation of redundant links according to one embodiment of the present invention.

FIG. 4 illustrates a flow diagram for the creation and switch-over of redundant links according to one embodiment of the present invention. For the sake of simplicity, the following discussion presupposes the determination that Transceiver-A is the primary transceiver and that Transceiver-B is the redundant or backup transceiver. One with ordinary skill in the art would understand that either transceiver could be selected as the primary or redundant transceiver and that the transceiver selected as the primary transceiver at one time may be selected as the redundant transceiver at another time.

At step 410, Transceiver-A sets up the primary physical link with the selected I/O device and at step 420, Transceiver-B sets up the redundant physical link with the same I/O device. It should be noted that steps 410 and 420 may be performed at the same time or in the reverse order to which they are depicted in FIG. 4.

At step 430 the primary physical link is set to on-line status and the redundant physical link is set to off-line status. It should be noted that on-line and off-line is the configuration of the physical link and that communication is still occurring across the physical link. For example, on the receive end of MAC 300, RXIN-A is the primary link, has an on-line status, and is receiving data from the I/O device and RXIN-B is the redundant link, has an off-line status, but is receiving redundant data from the I/O device. Also for example, on the transmit end of MAC 300, TXOUT-A is the primary link, has an on-line status, and is transmitting data to the I/O device, however, TXOUT-B is the redundant link, has an off-line status, and although is not transmitting packet data from the PID, it is transmitting idle code to the I/O device. The data is received and/or transmitted during step 440.

During data reception and/or transmission if a link failure or an interrupt, such as a configuration change from the I/O device, occurs the MAC must switch from the primary physical link to the redundant physical link (step 450). For switch-over to occur the MAC must set the primary physical link to off-line status and the redundant physical link to on-line status. After switch-over occurs, the data is then received and/or transmitted over the redundant physical link, step 460. For example, on the receive end of MAC 300, RXIN-A is still the primary link but would now have an off-line status after switch-over, and is receiving data from the I/O device and RXIN-B is still the redundant link but would now have an on-line status after switch-over, and is receiving data from the I/O device. Also for example, on the transmit end of MAC 300, TXOUT-A is still the primary link, but would now have an off-line status after switch-over, and is transmitting idle code to the I/O device, and TXOUT-B would still be the redundant link but would now have an on-line status, and would be transmitting packet data from the PID to the I/O device.

Using a single MAC with two transceivers enables a switch system that supports redundant physical links. Such a system is advantageous because the time necessary to switch from one transceiver to another transceiver within the same MAC is much faster than the prior art method of using two MACs to set up redundant physical links and switching from one MAC to the other MAC. Additionally, by using a single MAC with support for redundant physical links the switch bandwidth is not wasted on maintaining the idle link. This results in a lower system cost because the switch bandwidth and physical channels connecting to a port do not have to be duplicated.

Thus, a method and apparatus for a gigabit ethernet MAC (GMAC) has been described. Although specific embodiments, including specific equipment, and methods have been described, various modifications to the disclosed embodiments will be apparent to one of ordinary skill in the art upon reading this disclosure. Therefore, it is to be understood that such embodiments are merely illustrative of and not restrictive on the broad invention and that this invention is not limited to the specific embodiments shown and described.

What is claimed is:

1. Adapted for communication with an input/output (I/O) device, a media access controller comprising;
    a first transceiver having a first receiver and a first transmitter, the first transceiver being configured to send and receive data from a destination port;
    a second transceiver having a second receiver and a second transmitter, the second transceiver being configured to send and receive data from the destination port;
    wherein said first transceiver and said second transceiver establish a first physical link and a second physical link with the destination port such that if one of said first physical link and said second physical link is active and a link interruption occurs said media access controller may switch to the other of said first physical link and said second physical link as a backup link; and
    a CPU interface for providing interrupts to at least one of the first receiver and the second receiver in response selectable status events including the link interruption and failure of the I/O device.

2. The media access controller as described in claim 1 wherein said first receiver and said second receiver receive data from an I/O device over said first and second physical links respectively.

3. The media access controller as described in claim 1 wherein said first transmitter and said second transmitter transmit signals to an I/O device over said first and second physical links respectively and wherein data packets are transmitted over said active link and idle code is transmitted over said backup link.

4. The media access controller as described in claim 1 further comprising:
   a receiver output for outputting data to a port interface device.

5. The media access controller as described in claim 1 further comprising:
   a transmit input for accepting data from a port interface device.

6. The media access controller as described in claim 1 further comprising:
   a first clock domain at said first transceiver; and
   a second clock domain at said second transceiver.

7. The media access controller as described in claim 5 further comprising:
   a third clock domain at said transmit input.

8. The media access controller as described in claim 1 further comprising:
   a fourth clock domain for driving the remaining internal workings of said media access controller.

9. The media access controller as described in claim 1 further comprising:
   a first FIFO coupled to said first and second transceivers for passing data packets from said active link and discarding data from said backup link.

10. Adapted for communication with an input/output (I/O) device over a link, a media access controller comprising:
   a first transceiver having a first receive bus interface (RXIN-A) and a first transmit bus interface (TXOUT-A), the first transceiver configured to receive and send a data to the I/O device;
   a second transceiver having a second receive bus interface (RXIN-B) and a second transmit bus interface (TXOUT-B), the second transceiver configured to receive and send data from the I/O device;
   wherein one of said first and second transceivers acts as a primary transceiver and the other of said first and second transceivers acts as a backup transceiver, said primary transceiver is capable of being switched to an off-line status and said backup transceiver is capable of being switched to an on-line status when an interrupt occurs;
   a CPU interface for providing interrupts to at least one receiver of said first and second transceivers in response to selectable status events including a failure of the link or a configuration change of the I/O device;
   a receiver output for transmitting data to a port interface device; and
   a transmit input (TXIN) for accepting packet data from a port interface device.

11. The media access controller as described in claim 10 wherein said first receive bus interface and said second receive bus interface accept data from the I/O device over a first physical link and a second physical link respectively.

12. The media access controller as described in claim 10 wherein said first transmit bus interface and said second transmit bus interface send signals to the I/O device over a first physical link and a second physical link respectively.

13. The media access controller as described in claim 12 wherein said transmit bus interface of said primary transceiver sends data packets to said I/O device and said transmit bus interface of said backup transceiver send idle code to said I/O device.

14. The media access controller as described in claim 10 further comprising
   a first clock domain at said first transceiver; and
   a second clock domain at said second transceiver.
   a third clock domain at said transmit input.
   a fourth clock domain for driving the remaining internal workings of said media access controller.

15. The media access controller as described in claim 14 further comprising
   a first FIFO for adjusting frequency and phase differences between said first clock domain and said fourth clock domain and between said second clock domain and said fourth clock domain.

16. The media access controller as described in claim 14 further comprising
   a second FIFO for crossing from said third clock domain at said transmit input to said fourth clock domain driving said internal workings of said media access controller.

17. A method comprising:
   creating a first link between an input/output (I/O) device and a media access controller using a first transceiver including a first receiver and a first transmitter, the first receiver being capable of detecting an error event including a failure of the first link;
   creating a second link between the I/O device and the media access controller using a second transceiver including a second receiver and a second transmitter;
   detecting the error event by the first receiver and outputting a control signal to logic external from said media access controller over a channel separate from said first link and said second link;
   receiving an interrupt by said first receiver in response to the control signal; and
   switching from said first link to said second link if the interrupt occurs due to failure of said first link.

18. The method as described in claim 17 wherein said first and second links are created by said first transceiver and said second transceiver in a single media access controller.

19. The method as described in claim 17 wherein one of said first link and said second link is chosen as a primary link and the other of said first link and said second link is a backup link.

20. The method as described in claim 19 wherein signals are transmitted to an I/O device over said first and second links, data signals are transmitted over said primary link and idle code signals are transmitted over said backup link.

21. The method as described in claim 17 wherein the logic is a central processing unit.

22. The method as described in claim 19 wherein the error event further includes a configuration change in which the I/O device determines to switch a flow of data from the primary link to said backup link.

* * * * *